No. 625,335. Patented May 23, 1899.
A. T. HUNTER.
CATTLE YOKE.
(Application filed July 7, 1897.)
(No Model.)
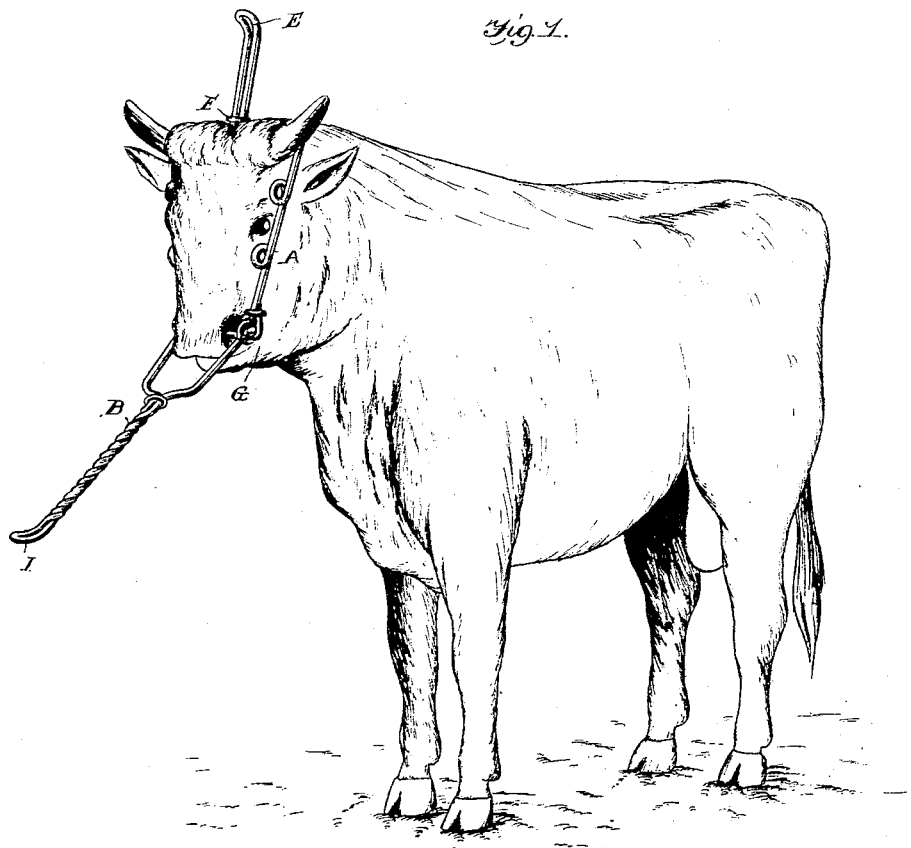
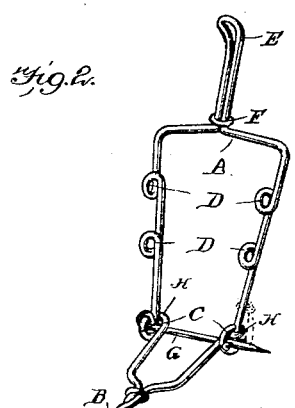
Witnesses
Inventor
Aldridge T. Hunter.
by O'Meara & Co.
Attorneys

UNITED STATES PATENT OFFICE.

ALDRIDGE T. HUNTER, OF NORMAN, OKLAHOMA TERRITORY.

CATTLE-YOKE.

SPECIFICATION forming part of Letters Patent No. 625,335, dated May 23, 1899.

Application filed July 7, 1897. Serial No. 643,745. (No model.)

*To all whom it may concern:*

Be it known that I, ALDRIDGE T. HUNTER, residing at Norman, in the county of Cleveland and Territory of Oklahoma, have invented a new and useful Cattle-Yoke, of which the following is a specification.

This invention has relation to certain improvements in cattle-yokes.

An object of the invention is to provide a yoke adapted to be fitted to the heads of cattle, the same being so arranged that there will be no possibility of the animals being injured in attempting to pass under or in jumping a fence, and also to provide means whereby the same will be prevented from passing through a fence.

A further object of the invention is to provide a cattle-yoke simple in construction and composed of but a few inexpensive parts.

With these and other objects in view the invention consists in certain novel features of construction and in combinations and arrangements of parts, as will be more fully hereinafter described, and specifically pointed out in the claims.

Referring to the accompanying drawings, illustrating my invention, Figure 1 is a perspective view showing my invention in operative position, and Fig. 2 is a perspective view of the yoke proper.

Like letters of reference will indicate similar parts wherever they occur throughout both views.

In the practical embodiment of my invention I have shown the yoke as consisting of two members A and B, the same being formed from single pieces of wire.

The member A is formed somewhat in the shape of a rectangular frame open at the bottom, the free ends of the wire being bent around to form loops C, loops D being also formed near the upper part of the sides of the frame, the remaining portion of the wire after the formation of said loops being bent inwardly, as at D, and upwardly to form the upper extended end E, a ring F being employed to freely slide up and down on said upper extended end to permit of the size of the opening being made smaller or larger, as occasion may require. This frame is adapted to pass over the head of the animal, the same passing around the horns and between the ears, so that there will be no possibility of its working loose.

G indicates a pin or spindle carried by and passing through the loops at the lower end of the frame. This pin or spindle also passes through one nostril and cartilage and out through the opposite nostril, the other end thereof being held within the loop, as shown, so as to secure the frame to the head of the animal at this point.

H indicates the looped ends of the member B, said looped ends being secured and freely movable within the loops carried by the lower free ends of the member A, the body portion of the member extending forwardly a short distance and bent upwardly at its end, as shown at I.

From the foregoing description it will be apparent that the parts are movably secured together and that the member B will be limited in its downward movement by reason of the pin or spindle passing through the loops carried by the member A, so that the animal will be permitted to feed without difficulty. The upwardly-extended portion E is intended to come into contact with the upper wires of the fence when the animal attempts to jump through the same, while the extended end I at the bottom of the member B will engage with the lower strand should the animal attempt to crawl through the fence. As these extended ends come in contact with the fence the progress of the animal will be retarded and he will be notified of the pending danger in time to prevent any injury.

The device herein described is exceedingly simple in construction and composed of but several parts which can be manufactured and sold at a slight cost.

I do not care to limit myself to the exact shape of the members herein set forth, and it is evident that the same might be made of any suitable material other than wire and that various other slight changes might be made in the formation and construction thereof without departing from the spirit and scope of my invention. Hence I do not care to confine myself to the exact construction herein set forth, but consider that I am entitled to all such changes or slight variations that may fall within the spirit and scope thereof.

Having thus fully described my invention, what I claim as new, and desire to secure by Letters Patent of the United States, is—

1. A device of the character described, comprising a yoke member having a guard and extending from its upper end and formed with loops at its lower end, a loop member having its extremities engaging the loops of the yoke member and having a guard-arm extending therefrom, and a pin adapted to be passed through the nose of the animal and the loops of the yoke member and support the loop member in a forwardly and downwardly inclined position, substantially as set forth.

2. A device of the character described, comprising a yoke member at its upper end with a guard-arm and having side portions extending downwardly on each side of the animal's head and formed with a plurality of loops, a loop member having a guard-arm and adapted to be placed in engagement with any desired loops of the yoke member, and a pin adapted to be passed through the nose of the animal and said loops and support the lower guard-arm in a forwardly and downwardly inclined position, substantially as described.

ALDRIDGE T. HUNTER.

Witnesses:
S. J. WILKINS,
CHAS. L. GORTON.